United States Patent [19]
Griesbach et al.

[11] Patent Number: 5,857,894
[45] Date of Patent: Jan. 12, 1999

[54] GRINDING MACHINE FOR THE GRINDING OF SPUR OR HELICA GEAR—WHEELS

[75] Inventors: Jurg Griesbach, Dietlikon, Switzerland; Erich Ronneberger, Waldshut, Germany; Walter Wirz, Pfaffikon, Switzerland

[73] Assignee: Reishauer AG, Wallisellen, Switzerland

[21] Appl. No.: 882,041

[22] Filed: Jun. 25, 1997

[30] Foreign Application Priority Data

Jun. 25, 1996 [DE] Germany .................. 196 25 370.5

[51] Int. Cl.⁶ .............. B24B 49/00; B23F 21/00
[52] U.S. Cl. .................. 451/5; 409/73; 409/77; 409/183; 409/203; 451/11; 451/47; 451/72; 451/236; 451/280; 451/253
[58] Field of Search ................. 83/490; 451/11, 451/5, 14, 24, 47, 56, 72, 139, 174, 236, 253, 280; 409/64, 73, 77, 183, 203

[56] References Cited

U.S. PATENT DOCUMENTS

| | | | |
|---|---|---|---|
| 810,903 | 1/1906 | Blechschmidt | 451/174 X |
| 3,708,920 | 1/1973 | Kaszub | 451/139 X |
| 3,959,929 | 6/1976 | Fleischmann et al. | 451/174 |
| 4,339,895 | 7/1982 | Fivian | 451/47 |
| 4,400,916 | 8/1983 | Bloch et al. | 451/21 |
| 4,953,522 | 9/1990 | Vetter | 451/56 |
| 5,072,548 | 12/1991 | Girard et al. | 451/21 |
| 5,076,020 | 12/1991 | Negri | 451/21 |
| 5,323,572 | 6/1994 | Guenin | 451/21 |
| 5,343,626 | 9/1994 | Nagata | 451/11 X |
| 5,573,449 | 11/1996 | Mackowsky | 451/47 |
| 5,645,467 | 7/1997 | Schriefer | 451/8 |

*Primary Examiner*—Timothy V. Eley
*Attorney, Agent, or Firm*—Sughrue, Mion, Zinn, Macpeak & Seas, PLLC

[57] ABSTRACT

In a stand (1), a work-piece spindle (2) is mounted for rotation around a vertical axis (C). On the stand (1), a slide (3) can be shifted horizontally and on the slide, a work-piece carrier (5) can be swivelled around a vertical axis (C1). On the carrier (5), a slide (6) can be shifted vertically. The slide (6) bears a linear guide element (7) able to be swivelled around a horizontal axis (A) and on which a second slide (8) can be shifted. The slide (8) bears the grinding spindle (axis B) with mounted grinding worm (9). A dressing device (12) is arranged, relative to the axis (C1), opposite the work-piece spindle (2). The machine makes easy operation possible, because all parts to be operated are quite accessible.

7 Claims, 1 Drawing Sheet

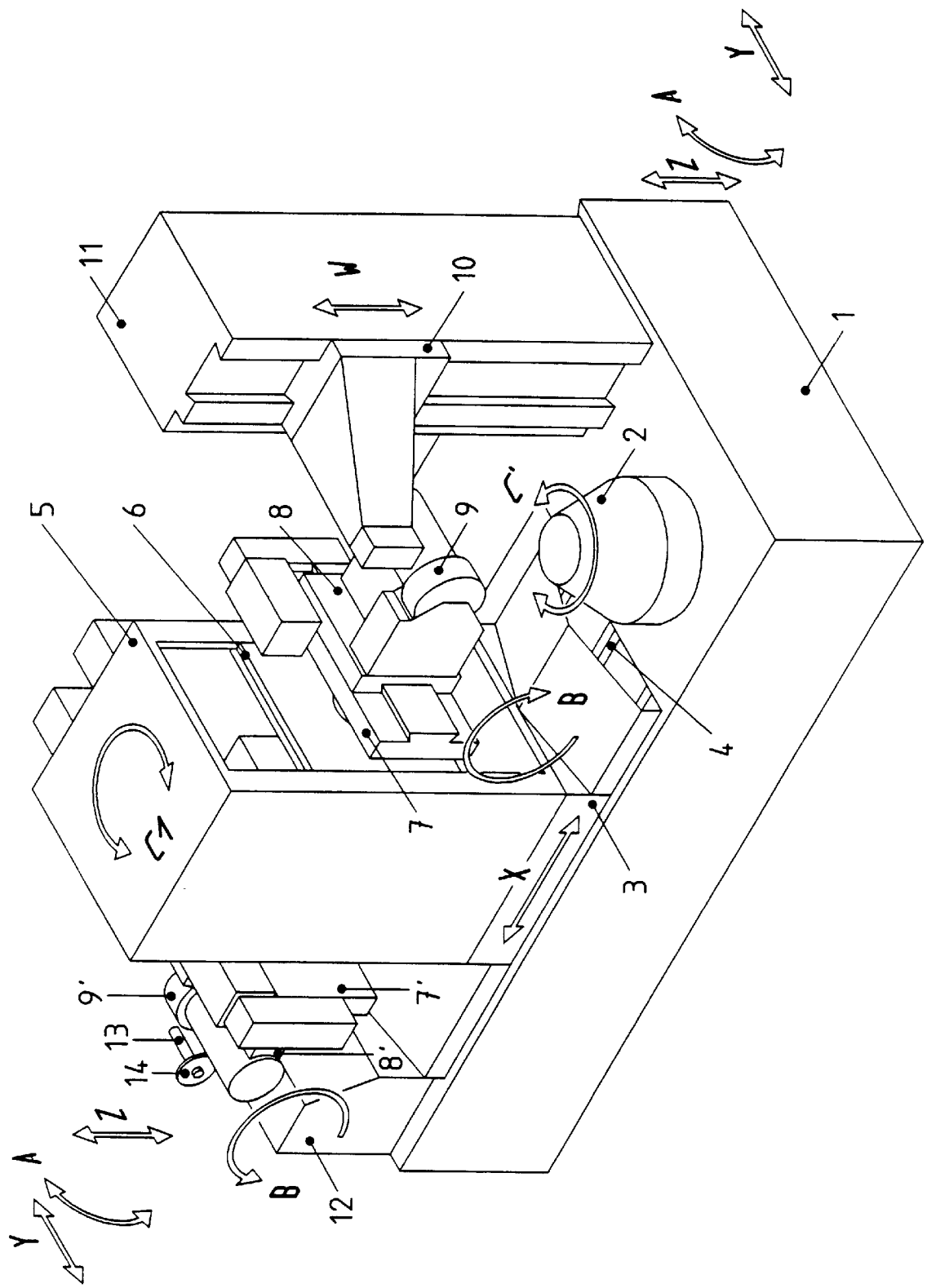

GRINDING MACHINE FOR THE GRINDING OF SPUR OR HELICA GEAR— WHEELS

BACKGROUND OF THE INVENTION

Toothed wheel grinding machines for the continuous, generating grinding of spur-or helical gear wheels are known from a prospectus "Konzept fuer Verzahnungsschleifen Reishauer RZ 362" [Concept for gear grinding]. A work-piece is mounted on a work-piece spindle which can be tilted around a horizontal axis crossing the work-piece spindle axis toward both sides. The grinding spindle is horizonal and mants the grinding worm. The grinding spindle can be fed-in radially towards the work-piece along said horizontal axis and is coupled with the work-piece spindle via a NC control. For the dressing of the grinding worm, a dressing device is arranged on the side of the grinding spindle opposite the work-piece spindle. The dressing tool, e.g., a diamond-coated dressing wheel, can be fed-in radially toward the grinding worm along said horizontal axis and is displaced parallel to the grinding spindle axis synchronously with the grinding spindle rotational angle.

The present invention is based on the technical problem of designing a device of the kind mentioned in the beginning in such a way that it is easier to operate. This technical problem is solved by the combination of features of claim 1.

BRIEF DESCRIPTION OF THE DRAWING

Below, an example of execution of the invention is explained with the aid of the drawing. The single figure shows a perspective view of a grinding device.

DETAILED DESCRIPTION OF THE INVENTION

In a stand 1, a work-piece spindle 2 is lodged rotating around a vertical axis C. A slide 3 can be horizontally shifted on rails 4 of the stand 1 and bears a tool-carrier 5 that can be swivelled around a vertical axis C1 on the slide 3. A slide 6 can be vertically shifted on the carrier 5. The slide 6 bears a linear guide element 7 that can swivel around a horizontal axis A and on which a slide 8 can be shifted perpendicular to the axis A. The slide 8 bears a grinding spindle with a mounted grinding worm 9. The grinding spindle axis B is parallel to the direction of shifting of the slide S. Above the spindle 2, a tail-stock 10 can be shifted in a vertical guide 11. A dressing device 12 is mounted on the stand 1, relative to the axis C, diametrically opposite the spindle 2 with respect to the axis C1; it comprises a dressing spindle 13 rotatable around a horizontal axially stationary relative to the stand 1. A dressing wheel 14 is mounted on the dressing spindle 13.

All moving elements are connected with corresponding drives, which are all controlled by a NC control.

On the slide 6, or on an additional, vertically shiftable slide on the carrier's 5 side opposite the guide element 7, an additional linear guide element 7' that can be swivelled around the axis A and can be arranged with a further slide 8' with grinding spindle and mounted grinding worm 9'.

For grinding, the grinding worm 9 is brought into contact with the work-piece toothed-wheel and is shifted along the axis C1 during the synchronous rotation of the grinding worm and the work-piece. For dressing, the carrier 5 rotates 180° into the dressing position in which the grinding worm is profiled or dressed. To change tools, the carrier 5 is rotated into an intermediate position. If slides 8, 8' are mounted on the carrier 5 on both sides, it is useful for the carrier 5 to be able to be swivelled 270° so that both grinding worms can be replaced in an optimal position. An additional apparatus, e.g. a measuring device for measuring ground work-pieces, may also be mounted on the carrier 5 offset at an angle from the slide 8.

The described device can be universally used for the grinding of cylindrical but also conical spur-toothed wheels. With it, almost all conceivable tooth profile shapes can be ground, in particular also the recently more often required "topologically modified" gearing.

The construction of the device allows unhindered access to the points of fixation of the work-piece from two sides: From the operator position for manual loading and unloading, and from the right side for automatic loading. Even if the machine is equipped with an automatic loading system, accessibility to the work-piece, e.g. for adjustment tasks, is not hindered in any way.

With the work-piece axis arrangement vertical and stationary relative to the stand, optimal conditions for the automatic loading are created. That also has the advantage that the weights of the work-pieces, which may vary greatly, are supported directly on the machine foundation-plate and not via slides or threaded spindles.

All relative adjustment and travelling movements, necessary for between the tool and the work-piece necessary for set-up and operation of the gear-grinding machine are executed by the tool, i.e., by the grinding worm 9. Those are the movements in the directions of the axes X, Y, Z, A, B, respectively. The work-piece itself executes only the rotational movement C driven by the workpiece spindle2.

A particularity of the device is the tool carrier 5 rotatable around the axis C1. This arrangement immediately offers several advantages:

The grinding attachment may be swivelled 180° around the vertical C1- axis out of the point of grinding into the profiling or dressing position. In this way, there can be unhindered accessibility to the dressing process, and the grinding worm is profiled at the same position on the grinding attachment as the position where grinding takes place afterwards. For reasons of precision, this is advantageous compared to the construction previously typical on such machines, in which the profiling devices are arranged, seen from the grinding worm, on the opposite side of the point of grinding. As opposed to this, the arrangement according to the invention ensures an at least partial compensation for always present, slight radial deviations and residual unbalance of the grinding worm due to the profiling procedure.

The profiling device is situated at a position facing away from the point of grinding. In this way, it is protected from being soiled with grinding oil and grinding shavings.

The profiling device is mounted stationary relative to the stand, i.e., the dressing wheel 14, apart form its rotation, is fixed to the stand and does not move during the dressing process. That facilitates operation.

The profiling of the grinding worm or the generating of the grinding worm pitch respectively can be carried out with the NC-axes X/Y/B of the machine i.e., no additional axes for the dressing apparatus are necessary in the basic configuration of the device.

If the tool carrier is swivelled only 90°, then the grinding attachment is in a very favorable position for replacing the grinding worm, because it is directly accessible from the front.

On the tool-carrier's 5 side opposite the grinding attachment, a second grinding attachment may be mounted, e.g. with a grinding worm for the rough-grinding of gearing or for the grinding of a second gearing on the same work-piece (toothed-wheel block).

We claim:

1. A grinding machine for the continuous generating grinding of spur or helical gear wheels, comprising:

a stand;

a work-piece spindle rotatably mounted in the stand for rotating around a first axis;

a carrier slidably mounted on the stand for displacement radially to the first axis and pivotable around a second axis which is parallel to the first axis;

a first slide slidably mounted on the carrier for displacement parallel to the second axis;

a linear guide element pivotably mounted on the first slide for pivoting around a third axis which is perpendicular to the second axis;

a second slide slidably mounted on the guide element for displacement perpendicular to the third axis;

a grinding spindle for mounting a grinding worm and rotatably mounted on the second slide;

a dressing mechanism arranged on the stand angularly displaced with respect to the second axis for dressing the grinding worm, wherein the carrier is pivotable around the second axis at least into a first position for grinding the work-piece and a second position for dressing the grinding worm; and a NC control unit for controlling all shifting, pivoting and rotational movements of movable machine elements.

2. The machine according to claim 1, wherein the carrier is pivotable into an additional third position to change the grinding worm.

3. The machine according to claim 1, wherein the dressing mechanism is arranged, relative to the second axis, diametrically opposite the work-piece spindle.

4. The machine according to claim 1, wherein a second linear guide element is pivotably mounted on the first slide on a side, with respect to the second axis, of the carrier opposite to the first mentioned linear guide element for pivoting around the third axis, a third slide being slidably mounted on the second guide element for displacement perpendicular to the third axis, a second grinding spindle for mounting a second grinding worm being rotatably mounted on the third slide.

5. The machine according to claim 1, wherein a third slide is slidably mounted on the carrier on a side opposite the first slide with respect to the second axis for displacement parallel to the second axis, a second linear guide element being pivotably mounted on the third slide for pivoting around a fourth axis which is perpendicular to the second axis, a fourth slide being slidably mounted on the second guide element for displacement perpendicular to the fourth axis, a second grinding spindle for mounting a second grinding worm being rotatably mounted on the fourth slide.

6. The machine according to claim 1, wherein an additional apparatus is mounted on the carrier offset at an angle around the second axis with respect to the first slide.

7. The machine according to claim 6, wherein the additional apparatus comprises a measuring unit for measuring ground work-pieces.

* * * * *